United States Patent
Fujimoto

(10) Patent No.: US 8,527,730 B2
(45) Date of Patent: Sep. 3, 2013

(54) DATA UPDATING METHOD, MEMORY SYSTEM AND MEMORY DEVICE

(75) Inventor: Akihisa Fujimoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 310 days.

(21) Appl. No.: 12/933,748

(22) PCT Filed: Sep. 9, 2008

(86) PCT No.: PCT/JP2008/066617
§ 371 (c)(1),
(2), (4) Date: Sep. 21, 2010

(87) PCT Pub. No.: WO2009/116195
PCT Pub. Date: Sep. 24, 2009

(65) Prior Publication Data
US 2011/0029726 A1     Feb. 3, 2011

(30) Foreign Application Priority Data

Mar. 21, 2008   (JP) ................. 2008-074258

(51) Int. Cl.
*G06F 12/00* (2006.01)
(52) U.S. Cl.
USPC ............... 711/173; 711/170; 711/E12.09
(58) Field of Classification Search
None
See application file for complete search history.

(56) References Cited

U.S. PATENT DOCUMENTS

| | | | |
|---|---|---|---|
| 5,748,940 A | 5/1998 | Angelo et al. | |
| 5,956,473 A * | 9/1999 | Ma et al. | 714/5.1 |
| 6,085,299 A | 7/2000 | Angelo et al. | |
| 7,275,153 B2 | 9/2007 | Kim | |
| 2002/0024088 A1 | 2/2002 | Taki | |
| 2005/0060528 A1 | 3/2005 | Kim | |
| 2006/0289642 A1* | 12/2006 | Huang et al. | 235/441 |
| 2007/0016763 A1 | 1/2007 | Koyama et al. | |
| 2007/0073962 A1 | 3/2007 | Nakamura et al. | |

FOREIGN PATENT DOCUMENTS

| | | |
|---|---|---|
| CN | 1598773 A | 3/2005 |
| JP | 7 84727 | 3/1995 |
| JP | 2002 73407 | 3/2002 |
| JP | 2002 351687 | 12/2002 |
| JP | 2004 220343 | 8/2004 |
| JP | 2007 25821 | 2/2007 |
| JP | 2007 94900 | 4/2007 |

OTHER PUBLICATIONS

Chinese Office Action issued Mar. 22, 2012, in China Patent Application No. 200880128254.4 (with English translation).
Extended Search Report issued Sep. 7, 2011 in European Application No. 08873494.2.

* cited by examiner

*Primary Examiner* — Reginald Bragdon
*Assistant Examiner* — Thanh D Vo
(74) *Attorney, Agent, or Firm* — Oblon, Spivak, McClelland, Maier & Neustadt, L.L.P.

(57) ABSTRACT

A data updating method, a memory system and a memory device in which the memory device is connectable to a host device and has a memory section and a memory controller, the memory section consists of a first memory section which can be divided into partitions having multiple different attributes, and a work space which is managed by the memory controller, and the method of updating data which is stored in the memory device uses one of the writing methods which has been selected from among multiple different writing methods of writing data into the partition, depending on the attribute of the partition, to perform an updating process, and can securely update the data.

8 Claims, 10 Drawing Sheets

FIG. 3

| Partition Number | Attribute of Partition |
|---|---|
| 0 | Data partition 1 |
| 1 | Data partition 2 |
| 2 | Code partition |
| 3~12 | Reserved |
| 13 | Boot partition 1 |
| 14 | Boot partition 2 |
| 15 | Information |

FIG.4

| | | | | | | LSB |
|---|---|---|---|---|---|---|
| 0000-000Fh for partition 0 | Vendor Use(64) | Size(32) | Rsv(26) | WPS(1) | SPS(1) | AM(1) | Type=001b |
| 0010-001Fh for partition 1 | Vendor Use(64) | Size(32) | Rsv(26) | WPS(1) | SPS(1) | AM(1) | Type(3) |
| 0020-002Fh for partition 2 | Vendor Use(64) | Size(32) | Rsv(26) | WPS(1) | SPS(1) | AM(1) | Type(3) |
| | ---------- | | | | | |
| 00F0-00FFh for partition 15 | Vendor Use(64) | Size(32) | Rsv(26) | WPS(1) | SPS(1) | AM=0 | Type=100b |
| 0100-010Fh | Size(32) for Vendor Use | Rsv(32) | Size(32) Toatl Partition Size | Rsv(16) | eSD Version No.(16) | | |
| 0110h-01FF for vendor use | Vendor Use | | | | | | |

Type: 000b: Partition not exit 001b: Application 010b: System 011b: Boot
    100b: Information Others: reserved
AM (Addressing Mode): 0: Byte Addressing 1: Block Addressing
SPS (Speed Class Support): 0: Not Supported 1: Supported
WPS (Write Protection Status): 0: Write Disable 1: Write Enabled
Size: Partition Size in unit of block

FIG.5A

Argument of Select Partition Command

| 1 | 1 | 6 | 1 | 3 | 4 | 2 | 22 | 7 | 1 |
|---|---|---|---|---|---|---|---|---|---|
| S | T | Index | MD | 000 | Select Partition | CWP | all 0 | CRC7 | E |

Mode
0: Select mode
  Select specified partition
1: Inquiry mode
  Get current selected partition

Select Partition
0000b: Default Application Partition
0001b: Free of use
  ⋮
1100b: Free of use
1101b: Boot Partition 1
1110b: Boot Partition 2
1111b: Information Partition

Control Write Protection
00b: Don't Care
10b: Set Write Protect of specified partition
01b: Clear Write Protect of specified partition
11b: Not used (Don't care)

FIG.5B

Response of Select Partition Command (New response type R8b)

| 1 | 1 | 6 | 1 | 3 | 4 | 1 | 1 | 22 | 7 | 1 |
|---|---|---|---|---|---|---|---|---|---|---|
| S | T | Index | MD | 000 | Selected Partition | Error | WPS | all 0 | CRC7 | E |

Mode
0: Select mode
1: Inquiry mode

Selected Partition
If requested partition does not exist, previous partition is selected.

Selection Error Status
If selection of requested partition is failed, Error is set to 1.

Write Protect Status
Indicates current protection status of selected partition.

DATA UPDATING METHOD, MEMORY SYSTEM AND MEMORY DEVICE

TECHNICAL FIELD

The present invention relates to a method of updating data which is stored in a memory device which is connectable to a host device and has a memory section divided into multiple partitions, a memory system and the memory device, and more particularly to a method of updating data in a partition in which data configured to start the host device is stored, the memory system and the memory device.

BACKGROUND ART

In a computer system, an operating system (hereinafter referred to as "OS") which is a system management program and system data of a host device, and the like have been stored in a memory device which is an external storage device. Then, at the time of startup of the system, the system is launched by reading the OS from the memory device. The OS, which is software configured to manage the entire computer system, is configured with multiple program file groups.

It should be noted that, at the time of startup of the OS, a special small program referred to as "boot loader" having a function enough for starting another program configured to start the OS is used. A multistage boot loader is often used, invocation of another small program from one small program is repeated, and finally the OS is started. In other words, for the startup of the OS, that is, the startup of the system, many programs with a small capacity are stored in the memory device.

The OS and the boot loader often need to be partially updated for adding functions or correcting defects. Then, if a module in the OS configured with the multiple program file groups, or a boot loader group or the like, is updated, the module can be correctly operated for the first time when all program files have been correctly updated. In other words, if a process of updating the OS or the boot loader fails, the system itself becomes unable to be started, and it has not been easy to fix a problem thereof.

On the other hand, in recent years, a flash memory which is a nonvolatile semiconductor storage medium has been developed, and particularly, a multi-valued recording technique in which a multi-valued bit, instead of a single bit, is stored in one memory cell has been put to practical use, and therefore, a capacity and a density of the flash memory have been progressively increased. Furthermore, recently, a system in which software for startup of the host device, that is, the OS and the boot loader are stored in an embedded memory device has been used.

A NAND-type flash memory uses charges which have been injected into a trap layer consisting of a floating gate or a laminated film, via a tunnel insulating film, as digital bit information depending on an amount of the charges, and reads the digital bit information as 2-valued or multi-valued information. The NAND-type flash memory can read the data without associated data destruction, which is different from a destructive read type memory such as a DRAM.

If the OS and the boot loader group are stored in the memory device having the NAND-type flash memory, the NAND-type flash memory has characteristics of 1) the data is written in units referred to as "pages", 2) the data is erased in units referred to as "blocks" in which multiple pages have been integrated, and 3) the data cannot be overwritten. Consequently, if the data which is stored in the NAND-type flash memory device is updated with data in small capacity units, a so-called "move" in which a program which does not need to be updated is also rewritten into another block may occur many times. In other words, data which is updated is written in a new block in which data has not yet been written, and furthermore, remaining data which is stored in an old block including old data and is not updated is also written in the new block. The "move" occurring many times means that the program is rewritten many times. Consequently, in some cases, the process of updating the OS or the boot loader group in a conventional NAND-type flash memory device has not been regarded as highly secured.

It should be noted that Japanese Patent Application Laid-Open Publication No. 2007-193596 has disclosed a firmware updating circuit in which, even if a failure such as power discontinuity has occurred at the time of updating firmware, data related to the firmware can be updated onboard without replacing a nonvolatile memory.

DISCLOSURE OF INVENTION

Object of the Invention

It is an object of the present invention to provide a data updating method, a memory system and a memory device which can securely update data which is stored in the memory device.

Means For Solving the Problem

According to an aspect of the invention of the present application, a method of updating data is provided, the data stored in a memory device which is connectable to a host device and has a memory section and a memory controller, the memory section consisting of a first memory section which can be divided into partitions having multiple different attributes, and a work space which is managed by the memory controller, wherein, from among multiple different writing methods of writing data into the partition, one of the writing methods which has been selected depending on the attribute of the partition is used to perform an updating process.

BRIEF DESCRIPTION OF THE DRAWINGS

FIG. 3 is an explanatory diagram for explaining the configuration of the memory section of the memory device according to the first embodiment;

FIG. 4 is an explanatory diagram for explaining a structure of an information partition in the memory device according to the first embodiment;

FIG. 5A is an explanatory diagram for explaining a select partition command in the memory device according to the first embodiment;

FIG. 5B is an explanatory diagram for explaining the select partition command in the memory device according to the first embodiment;

BEST MODE FOR CARRYING OUT THE INVENTION

<First Embodiment>

Figure 1:
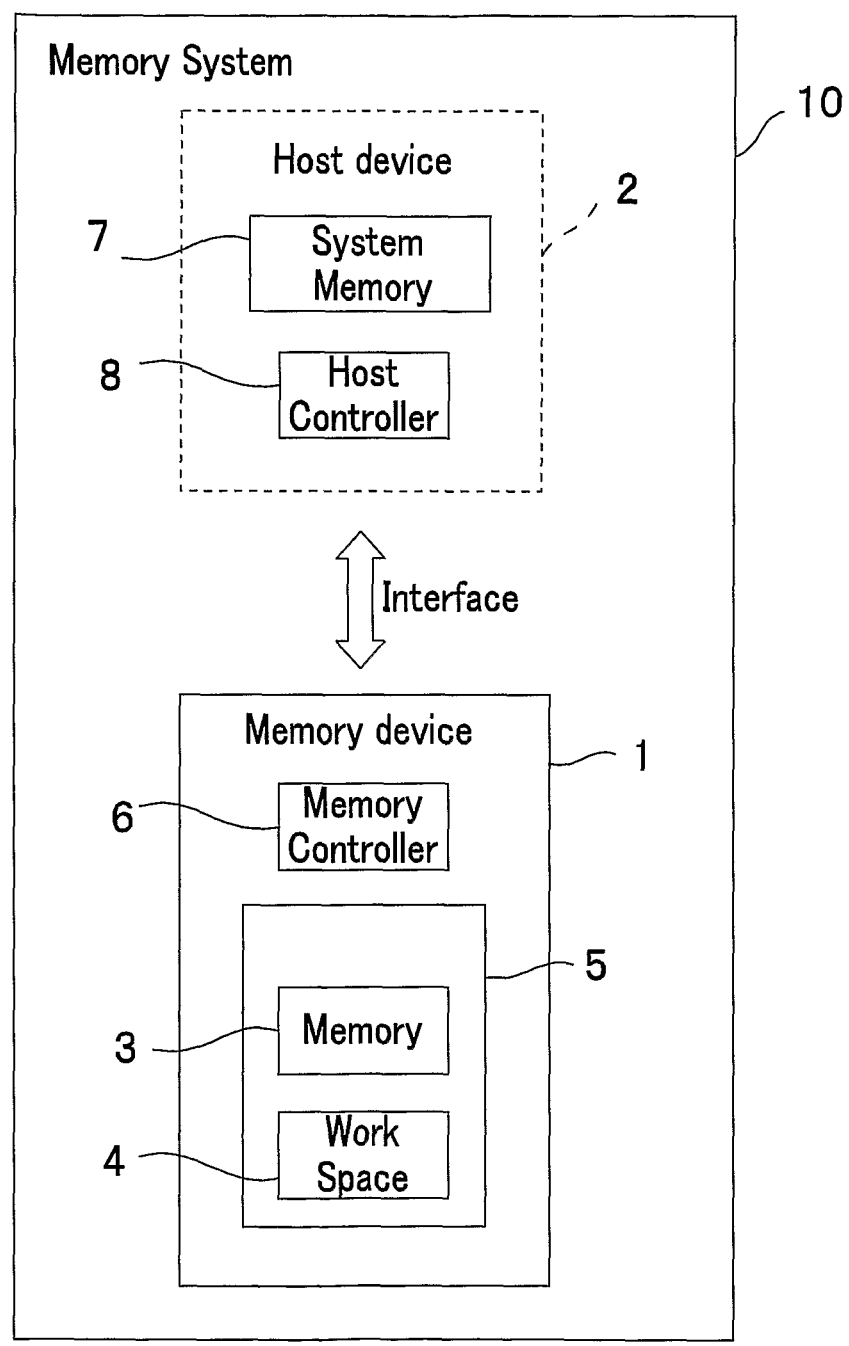
FIG. 1 is a schematic diagram showing a configuration of a memory system according to a first embodiment.

First, a memory system 10 of a first embodiment of the present invention will be described with reference to the drawings. FIG. 1 is a schematic diagram showing a configuration of the memory system 10.

The memory system 10 is configured with a host device 2, and a memory device 1 which is connectable to the host device 2, can store data configured to start the host device 2, and has been embedded in the memory system 10.

A memory section 5 of the memory device 1 is a nonvolatile semiconductor memory, and is configured with, for example, a NAND-type flash memory. Data and the like which have been transmitted from the host device 2 are stored in the memory section 5 under the control of a memory controller 6.

The memory section 5 is configured with a memory section 3 which is a first memory section that can be recognized by a user, and a work space 4 which is managed by the memory controller 6 and cannot be recognized by the user.

It should be noted that, in the memory device 1, a relationship between the memory section 3 and the work space 4 is not fixed, and under the control of the memory controller 6, a part of the memory section 3 and a part of the work space 4 can be replaced with each other, that is, a replacing process is possible in which one partition in the memory section 3 is set as the work space 4 which cannot be recognized by the user, and conversely, a part of the work space 4 is set as one partition in the memory section 3 which can be recognized by the user.

The host device 2 is provided with a host controller 8 configured to perform access control and the like for the memory device 1 connected via an interface, and a system memory section 7. The memory device 1 performs a process according to a command from the host device 2.

Figure 2:
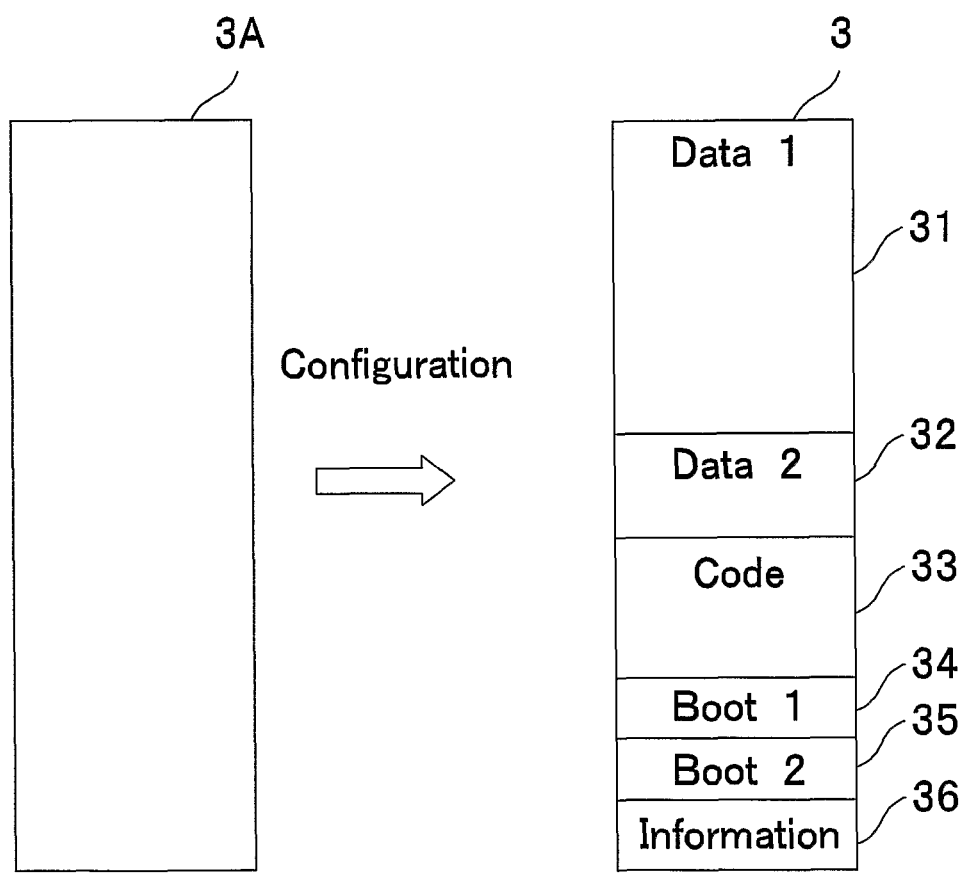
FIG. 2 is an explanatory diagram for explaining a configuration of a memory section of a memory device according to the first embodiment.

It should be noted that although an example in which the memory system 10 has one memory device 1 will be described in FIG. 1 and the following descriptions, the memory system 10 may have multiple memory devices 1. Next, a configuration of the memory section 3 which is the first memory section of the memory device 1 of the present embodiment will be described by using FIGS. 2, 3 and 4. FIGS. 2 and 3 are explanatory diagrams for explaining the configuration of the memory section 3 of the memory device 1, and FIG. 4 is an explanatory diagram for explaining a structure of an information partition in the memory device 1.

As shown in FIG. 2, the memory section 3 of the memory device 1 has been partitioned into multiple partitions depending on an attribute of data to be saved. In other words, in a publicly known memory device, an entire memory section 3A which is a storage area has been managed as one partition. In contrast, in the memory device 1 of the present embodiment, the memory section 3 is physically divided into multiple partitions 31 to 36 by a process referred to as "Configuration". In FIG. 2, the left side shows the memory section 3A which is one large storage area, and the right side shows an example in which the memory section 3 has been divided into the multiple partitions 31 to 36, that is, applied with the Configuration. It should be noted that, here, "physically" is not "logically", and means division corresponding to each storage cell in an actual memory section 3, that is, "differentiation" of each storage cell aggregation.

In the memory device 1, the respective divided partitions 31 to 36 have multiple different attributes. For example, the memory section 3 illustrated in FIG. 2 has been divided into the multiple partitions 31 to 36, and the respective partitions have attributes shown in FIG. 3. In other words, a data 1 partition 31 and a data 2 partition 32 have a data attribute, a code partition 33 has a code attribute, a boot 1 partition 34 and a boot 2 partition 35 have a boot attribute, and an information partition 36 has an information attribute. In other words, the multiple partitions 31 to 36 do not have different attributes respectively, and the number of kinds of the attributes is smaller than the number of the partitions 31 to 36.

The partitions 31 and 32 with the data attribute (hereinafter also referred to as "data partition") are also referred to as "application partition". The application partition is a partition configured to store user data, an application program and the like, is managed by a file system, and is a partition in which not only the number of times of writing but also the number of times of reading is large. It should be noted that, for example, usage in which the user data is stored in the data 1 partition 31 and the application program is stored in the data 2 partition 32 is also possible.

The partition 33 with the code attribute (hereinafter also referred to as "code partition") is also referred to as "system partition". The system partition is a partition configured to store an OS program and system data and is managed by the file system, and although the number of times of reading is large, the writing is hardly performed.

The partitions 34 and 35 with the boot attribute (hereinafter also referred to as "boot partition") are partitions configured to store a boot loader, and do not have the file system, and although the number of times of reading is large, the writing is hardly performed. The boot loader may be a Primary Boot Loader which is read first at the time of startup, or a configuration may be possible in which the Primary Boot Loader is included, for example, in a ROM, outside the memory device 1 and a Secondary Boot Loader is stored in the memory section 3.

As shown in FIG. 4, the partition 36 with the information attribute (hereinafter also referred to as "information partition") is a partition configured to store information on the multiple divided partitions, for example, existence or nonexistence information, attribute information, write-protection information, a partition capacity (size) and the like on a partition of a predetermined partition number, and does not have the file system, and although the number of times of reading is large, the writing is performed only once.

The information partition 36 is a partition necessary for the memory device 1 of the present embodiment in which the memory section 3 has been physically divided into the multiple partitions by the Configuration. The memory controller 6 of the memory device 1 changes a method of accessing the multiple partitions, based on the information in the information partition.

For example, if data in the boot partition 34 has been corrupted, the system is not launched and a boot code itself becomes unable to be updated. Therefore, the boot partition 34 is a partition which particularly requires reliability of the update.

Then, since the memory section 5 of the memory device 1 of the present embodiment is the NAND-type flash memory for multi-valued recording, physical characteristics of the divided partitions 31 to 36 have preferably different specifications depending on the respective attributes. Here, the physical characteristics are a data writing speed, a data reading speed, reliability of the written data, and the like. For example, also in the memory section 5 capable of the multi-valued recording, physical characteristics equivalent to single-bit recording can be obtained by providing a partition in which the multi-valued recording is not performed, although a storable capacity is reduced. Similarly, for example, a memory cell capable of 8-valued recording can also be used as a memory cell for 4-valued recording.

For example, a speed at which the host device 2 accesses the memory device 1 can be improved by setting the information partition 36 with the information attribute as a partition which can be accessed at a higher speed than other partitions. Moreover, the partition with the boot attribute or the partition with the attribute of the code partition is also preferably set as a partition with the physical characteristics with higher reliability than other partitions. It should be noted that although the number of times in which the writing can be performed and the number of times in which the reading can be performed, in the partitions 31 to 36, are not direct physical characteristics but alternative characteristics, here, the numbers of times are assumed as the physical characteristics.

As described above, in the memory device 1, if the memory section 3 has been divided, the physical characteristics of the respective divided partitions 31 to 36 are different, and therefore, a total capacity of the divided multiple partitions 31 to 36 does not necessarily become the same as a capacity of the memory section 3 before being divided.

It should be noted that FIG. 3 is a table showing an example of a partition map assignment in the memory section 3. In the memory device 1, partition numbers are distinguished by 4-bit data. Consequently, the host device 2 and the like can select maximum 16 partitions of No. 0 to No. 15 by using the partition number in a select partition command. Of course, as shown in FIG. 3, reserved partitions which are not set also exist in the maximum 16 partitions.

When the host device 2 uses the command to control the respective partitions, the host device 2 uses the respective partitions 31 to 36 with their respective partition numbers as parameters. In other words, if the host device 2 stores the data in or reads the data from the respective partitions 31 to 36, first, the host device 2 transmits the select partition command shown in FIG. 5A to the memory device 1, thereby specifies the partition number, and selects one partition. In response, the memory device 1 responds to the host device 2 with a response to the select partition command shown in FIG. 5B. Subsequently, the host device 2 transmits a read/write command which is common to the respective partitions, for the selected partition, to the memory device 1, and thereby performs the access.

For example, the host device 2 can obtain the partition information and the like on the memory device 1 by accessing the information partition 36 assigned to the partition number 15 in the memory device 1.

Figure 6:
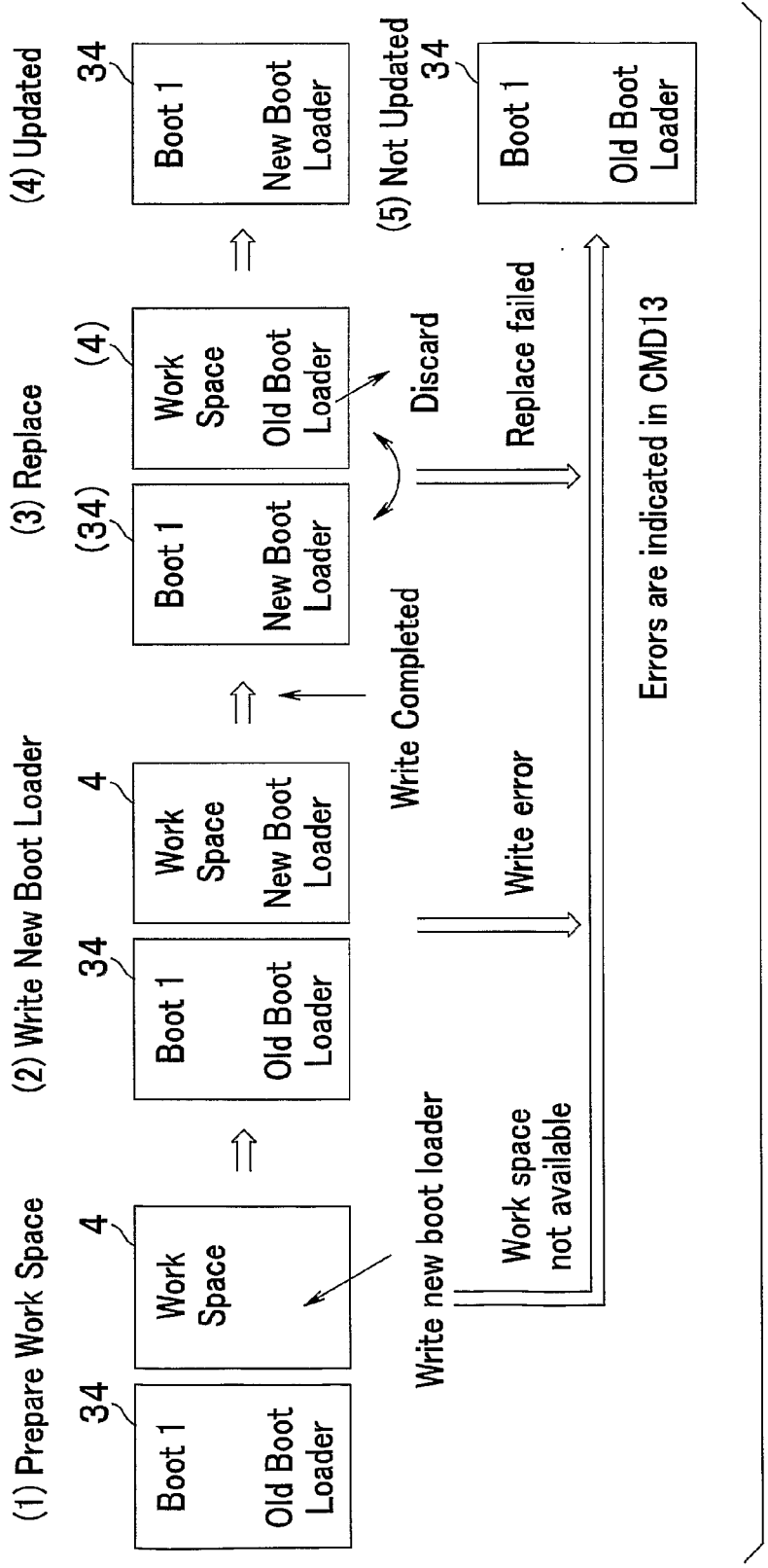
FIG. 6 is an explanatory diagram for explaining a process of updating a partition with a boot attribute in the memory device according to the first embodiment.
Figure 7:
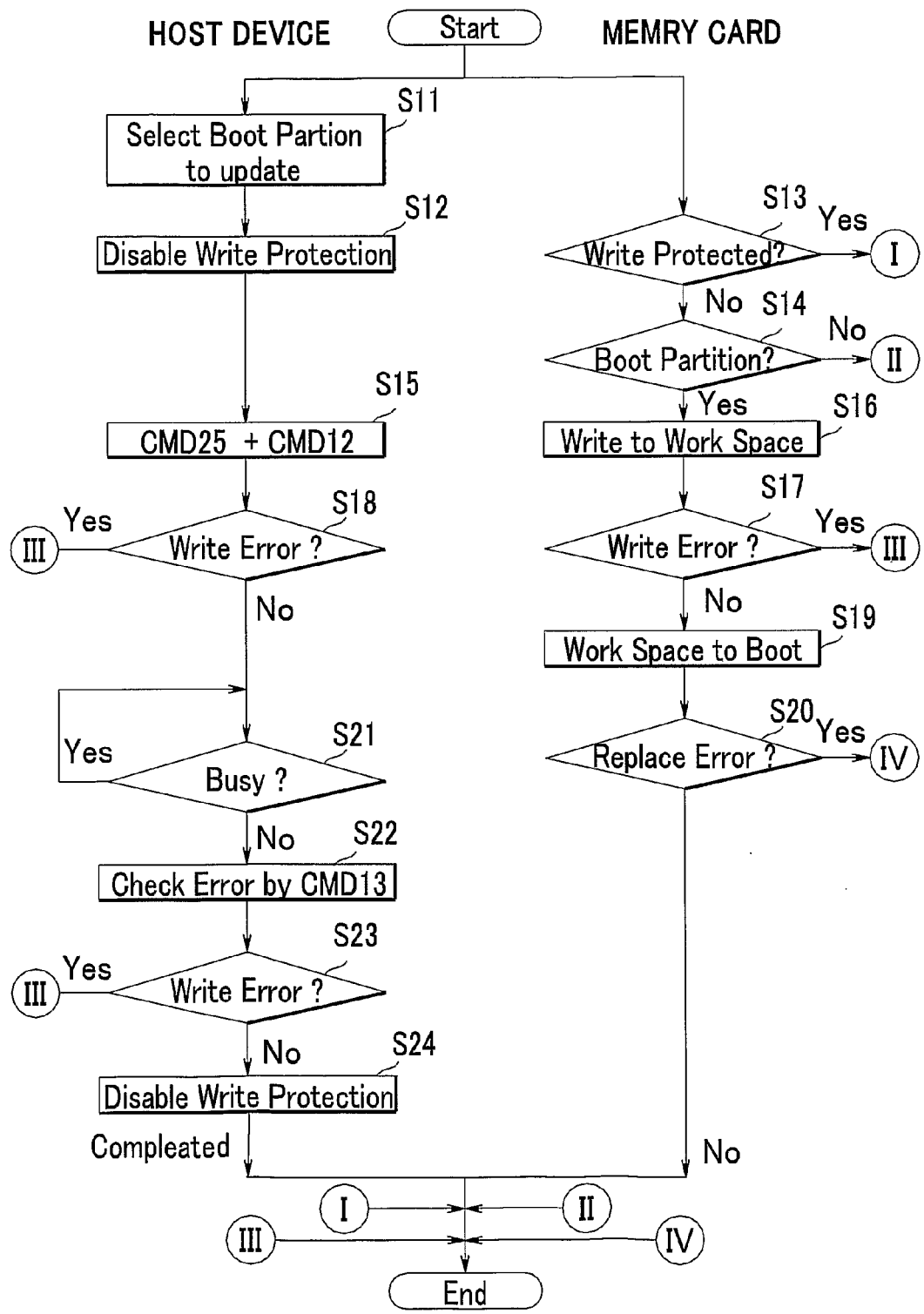
FIG. 7 is a flowchart for explaining a flow of the process of updating the partition with the boot attribute in the memory device according to the first embodiment.

Next, a data updating method of the present embodiment will be described by using FIGS. 6 and 7. FIG. 6 is an explanatory diagram for explaining a process in the case where the boot loader which is stored in the boot 1 partition 34 is updated. FIG. 7 is a flowchart for explaining a flow of the process in the case where the boot loader which is stored in the boot 1 partition 34 is updated.

As has been already described, in the boot 1 partition 34 configured to start the system of the host device 2, a boot loader group configured with many small programs is stored. And, the boot 1 partition 34 is the partition which particularly requires the reliability of the updating process. Consequently, in the data updating method of the present embodiment, at the time of a process of updating the boot 1 partition 34, a method different from the method for other partitions is used to assure security of the updating process.

In other words, the boot loader is limited in size, and therefore, is a program with a small capacity. Consequently, in the process of updating the boot 1 partition 34, the memory controller 6 can store a new boot loader which is updated and the like in a work space 4. Subsequently, the memory controller 6 replaces the work space 4 in which the new boot loader which is updated and the like have been stored and the boot 1 partition 34 with each other.

Hereinafter, according to the flowchart of the FIG. 7, the process of updating the boot 1 partition 34 will be described.

<Step S11> Select Boot Partition to be Updated

The host device 2 selects the partition to be updated, with the select partition command.

<Step S12> Disable Write Protection

In the memory device 1 of the present embodiment, the boot 1 partition 34 has been set to a write protection state by protecting means to be described later, in order to prevent tampering by a virus or the like. Consequently, the write protection state in the boot 1 partition 34 needs to be disabled by a prescribed method.

<Step S13> Is Write Protection Disabled?

If the write protection for the partition selected by the host device 2 has been able to be disabled (No), the memory device 1 performs processes at step S14 and subsequent steps. On the other hand, if the write protection for the boot 1 partition 34 has not been able to be disabled (Yes), the memory device 1 transmits a response signal indicating an error to the host device 2, and stops the updating process.

<Step S14> Write to Boot Partition?

If the partition selected by the host device 2 is the partition with the boot attribute (Yes), the memory device 1 performs the updating process with a writing method at step S15 and subsequent steps to assure the security of the updating process. On the other hand, if the partition selected by the host device 2 is not the partition with the boot attribute (No), the memory device 1 performs the updating process with a writing method different from the writing method at step S15 and subsequent steps.

<Step S15> CMD 25+CMD 12

Even when the host device 2 updates the boot 1 partition 34, the host device 2 uses a multi-block write command (CMD 25) and a write stop command (CMD 12) which are normal, because the memory controller 6 or the like which controls the memory device 1 has already recognized that the attribute of the partition being selected is "Boot", at step S12. Thus, even if the memory controller 6 receives the same memory write command as a normal memory write command from the host device 2, the memory controller 6 changes the updating method for the boot 1 partition 34.

<Step S16> Write to Work Space

As shown in FIG. 6(1), if the boot 1 partition 34 is updated, first, the memory controller 6 prepares a work space 4 having a size in which the boot loader which is stored in the boot 1 partition 34 can be stored, that is, having the same capacity as a capacity of the boot 1 partition 34, in the work space 4. If the work space 4 has not been able to be obtained in the work space 4, the memory controller 6 does not execute a writing process, transmits an error response signal indicating that the work space is not available, to the host device 2, and stops the updating process.

If the work space 4 has been able to be obtained in the memory section 5, as shown in FIG. 6(2), the memory controller 6 writes data of a new boot loader group into the work space 4 from the beginning to the end of an area thereof at once, that is, sequentially. For writing sequentially, that is, sequential write, the host device 2 uses the multi-block write command (CMD 25).

<Step S17, Step S18> Write Error?

If a write error has occurred at step S16, the memory controller 6 cancels the work space 4, and transmits error information on a write failure, on a response signal for the CMD 12 to the host device 2. The host device detects the error at S17, and stops the updating process.

<Step S19> Replacing Process

If the data write into the work space 4 has been correctly completed, the memory controller 6 performs a replacing process in which the work space 4 is assigned as the boot partition 34 to be used at the time of startup of the host device 2 and the boot 1 partition 34 is assigned to the work space 4.

At a time point when the replacing process has been completed, the work space 4 becomes a new boot 1 partition 34. However, if the replacing process has failed, the boot 1 partition 34 retains previous data and contents of the work space 4 are discarded.

<Step S20>

The memory controller 6 confirms whether or not the replacing process has failed. If the replacing process has failed (Yes), the updating process is stopped.

<Step S21, Step S22, Step S23> Check Error by CMD 13/Write Error?

When the writing process is completed (step S19: No), the host device 2 confirms whether or not there is an error in a response signal for a command CMD 13. If the CMD 13 is used and there is no error at all in the response signal (step S22: No), a process of updating the boot loader into the work space 4 is successful. If there has been an error in the response signal for the CMD 13, the updating process is stopped.

<Step S24>

If the replacing process has not failed (step S24: No), the host device 2 sets the boot 1 partition 34 to the write protection state again, and completes the updating process.

It should be noted that, in the above described process, even if the updating process has been stopped at any step in the updating process, since the boot code before the updating process is stored in the boot 1 partition 34, the host device 2 can be started.

Even if a sequence of the update has been aborted, the memory device 1 of the present embodiment can cancel the update and use the boot loader which has been previously stored. Therefore, such a situation that the system becomes unable to be started can be avoided.

In other words, if the update of the boot partition has failed, a situation occurs where the system becomes unable to be launched if the previous data cannot be read. However, in the memory device 1, the data in the partition with the boot attribute can be securely updated by using the work space 4 and performing the writing.

Moreover, even when the boot 1 partition 34 is updated, the host device 2 can use the normal memory write command. In other words, in the memory device 1, at the time of the process of updating the boot 1 partition 34, it is possible to use the method different from the method for other partitions to assure the security of the updating process, without the user's recognizing the process particularly.

It should be noted that, as shown in FIG. 2, the memory device 1 of the present embodiment has not only the boot 1 partition 34 but also the boot 2 partition 35 which is a fifth partition with the same boot attribute, as a backup partition. In other words, a fifth partition boot code in the boot 2 partition 35 is the same as a second partition boot code in the boot 1 partition 34. Consequently, it is also possible to use the boot 2 partition 35 as the work space and perform the process of updating the boot 1 partition 34. It is also possible to take double safety measures by performing a so-called partition swap process in which boot has been set so that the boot can be performed from the boot 2 partition 35 if there has been a read error or the like in the boot 1 partition 34 after the updating process. However, in order to use the boot 2 partition 35 for the startup of the host device 2, it is necessary to define a special command. Consequently, the memory system 1 becomes complicated, and therefore, the swap process has also an unfavorable aspect.

<Second Embodiment>

Figure 8:
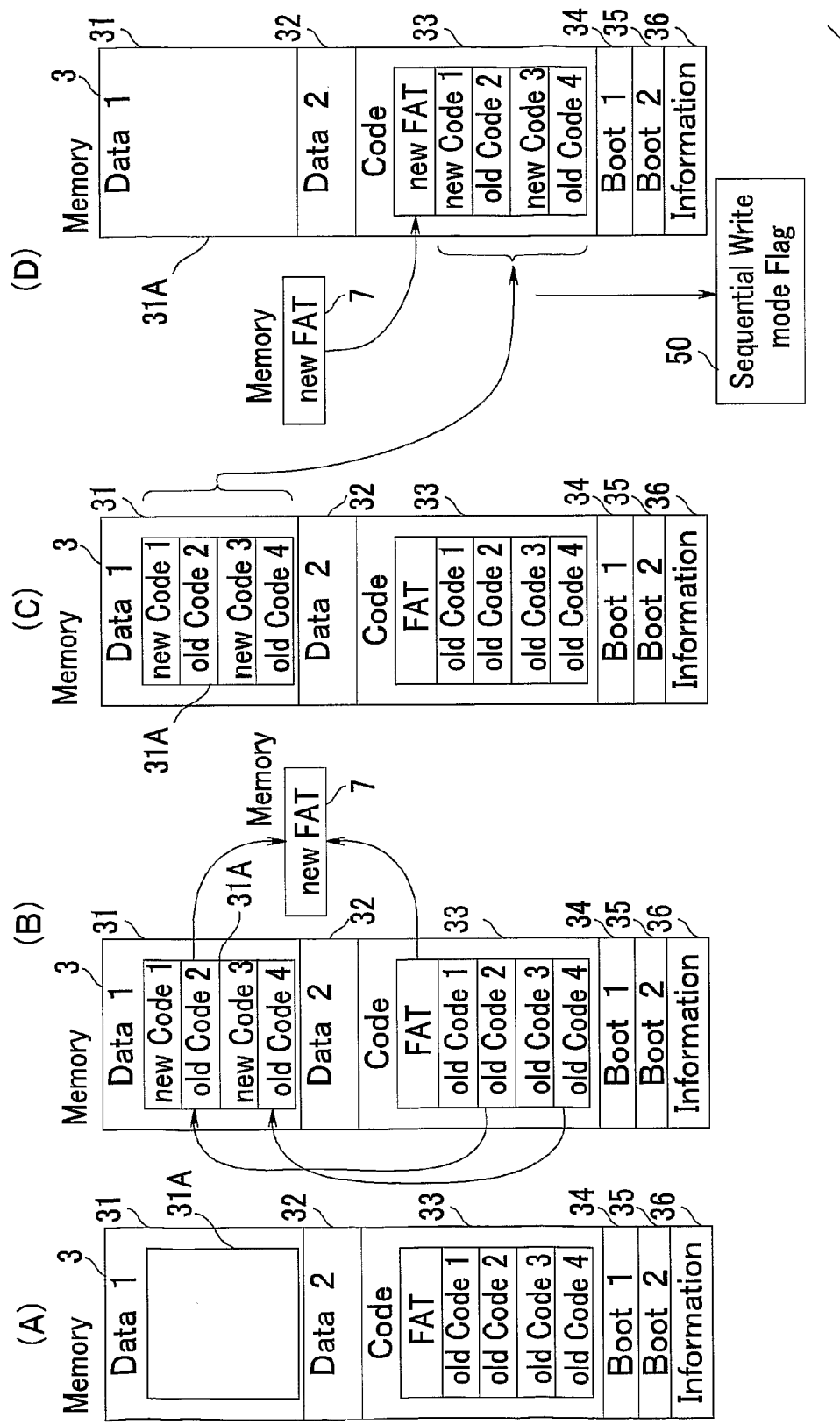
FIG. 8 is an explanatory diagram for explaining a method of updating data in a code partition in the memory system according to a second embodiment.

Next, a memory system 10A (not shown) of a second embodiment of the present invention will be described with reference to FIG. 8. FIG. 8 is an explanatory diagram for explaining a method of updating data in the code partition 33 in the memory system 10A. Since a basic configuration of the memory system 10A of the present embodiment is approximately the same as the memory system 10 of the first embodiment, hereinafter, the same components are attached with the same reference characters and descriptions thereof are omitted, and only different points from the memory system 10 will be described.

In the memory system 10A, when the data in the code partition 33 is updated, a data updating method depending on the code attribute is used. Similarly to the boot partition 34, the code partition 33 is a partition in which the system itself becomes unable to be started if the updating process fails. Consequently, in the memory system 10A, also for the update of the data in the code partition 33, in order to perform the update with maximum security, similarly to the update of the boot partition 34, a method is used in which the work space 4 with the same size as the size of the code partition 33 is secured in the memory section 5 and the update is performed.

In other words, since the code partition 33 is managed by the file system, although a part of a file can be updated, a so-called "move" occurs and code data is written many times if random write is performed with the normal write command. If a power supply has failed during the updating process, the data in the code partition 33 may be corrupted. Consequently, although it is possible to directly write into and update the code partition 33 similarly to a method of writing into the partition with the data attribute or the like, the sequential write in which the writing into another partition is performed once and subsequently the writing into the code partition 33 in order from the beginning thereof is performed provides higher security.

However, the boot partition 35 is a partition with a relatively small capacity, whereas a capacity of the code partition 33 is unknown. Consequently, in the code partition 33, the work space 4 with the same capacity as the capacity of the code partition 33 cannot be necessarily secured in the memory section 5.

Consequently, in a process of updating the code partition 33, if the work space 4 cannot be secured in the memory section 5, the memory controller 6 uses a method in which a program required for the update has been constructed in another partition, for example, the data partition 31, in the memory section 3.

FIG. 8 shows an example of a method of updating the program which has been stored in the code partition 33 if the work space 4 cannot be secured in the memory section 5.

In the example shown in FIG. 8, a code 1 and a code 3 are updated from an Old Code 1 and an Old Code 3 to a New Code 1 and a New Code 3 which are new, respectively, and a code 2 and a code 4 are an Old Code 2 and an Old Code 4 which are not updated.

As shown in FIG. 8(A), first, the memory controller 6 secures a partition with the same size as the size of the code partition 33, strictly, a work space area 31A which is an area with the same size as the size of the code partition 33 excluding FAT (File Allocation Table) data, in the data 1 partition 31.

Then, as shown in FIG. 8(B), the memory controller 6 writes the New Code 1 and the New Code 3 which are applied with the updating process, into the work space area 31A, and simultaneously also copies the Old Code 2 and the Old Code 4 which are not updated, from the code partition 33 to the work space area 31A. The memory controller 6 generates the FAT data for a new code partition after the updating process, in the system memory section 7.

In other words, as shown in FIG. 8(C), in the work space area 31A, a state is constructed in which the Old Code 2 and the Old Code 4 which are not applied with the updating process and the New Code 1 and the New Code 3 which are applied with the updating process have been stored in a continuous state.

It should be noted that, for the process of updating the code partition 33, the code partition 33 to be updated is selected with the select partition command. The code partition 33 has been normally set to the write protection state by the protecting means, in order to prevent the tampering by the virus or the like, similarly to the partition with the boot attribute. Consequently, the write protection state in the code partition 33 is disabled by the prescribed method. Even if the code partition 33 is updated, the host device 2 may use the normal memory write command, because the memory controller 6 or the like which controls the memory device 1 has recognized that the attribute of the selected partition is "Code". Consequently, even if the memory controller 6 receives the same memory write command as the normal memory write command from the host device 2, the memory controller 6 performs the updating process with a method of writing into the partition with the code attribute.

Then, as shown in FIG. 8(D), the memory controller 6 performs the data write into the code partition 33 by sequentially writing from a start address so that the "move" may not occur. In other words, the memory controller 6 sequentially writes the FAT data which has been stored in the system memory section 7, as well as the data which is not applied with the updating process and the data which is applied with the updating process, both of which have been stored in the work space area 31A, into the code partition 33.

In the memory system 10A, even if a work space with a size required for the updating process cannot be secured in the memory section 5, it is possible to use a method different from a method of writing into other partitions to assure the security of the updating process of the code partition 33.

As described above, in the memory system 10A, a third partition 33 which is one of the partitions is the partition 33 having the code attribute as the attribute, in which data of the OS program of the host device 2 has been stored. The method of updating the data in the third partition 33 stores the Old Code 2 and the Old Code 4 which are data which is not updated, and the New Code 1 and the New Code 3 which are data which is updated, both of which are stored in the third partition 33, in a fourth partition 31 which is one of the partitions in which the data of the OS program of the host device 2 which is stored in the third partition 33 can be stored, stores the file allocation table (FAT) in the third partition 33 after the updating process, in the system memory section 7, and performs the sequential write in which the file allocation table which has been stored in the system memory section 7, as well as the Old Code 2 and the Old Code 4 which are the data which is not updated, and the New Code 1 and the New Code 3 which are the data which is updated, both of which have been stored in the fourth partition 31, are sequentially written into the third partition 33.

It should be noted that, in the memory system 10A, for example, it is preferable that a flag 50 is put up during the process of updating the code partition 33, that is, the updating flag 50 is set before the process of updating the data in the code partition 33 is started, and the updating flag 50 is cleared when the updating process has been completed. Then, in the memory system 10A, in the case where the host device 2 is restarted, if the updating flag 50 in the code partition 33 has been put up, that is, the updating flag 50 has been in a state of being still set, it is recognized that the system has been brought down. Then, in the memory system 10A, it is preferable that the program of the boot loader has been configured so that the code partition 33 is reinstalled without performing a process of starting the host device 2.

In other words, in the memory system 10A, a risk where the system becomes unable to be restarted can be avoided by using the updating flag 50 in the code partition 33. In other words, the memory system 10A has a mechanism configured to, if the update has not been able to be correctly performed during the process of updating the code partition 33, stop the startup of the system and restore the system.

If the boot code which is stored in a second partition 35 has not been able to be read at the startup time, the memory system 10A described above reads the boot code which is stored in the work space 4. Moreover, if the startup has been performed by reading the boot code which is stored in the work space 4, the memory system 10A writes the boot code which is stored in the work space 4, into the second partition 35. Moreover, the memory system 10A is the memory system 10A which sets the updating flag 50 before the process of updating the data in the second partition is started, and clears the updating flag 50 when the updating process has been completed, and if the updating flag 50 has been set at the startup time of the host device 2, does not perform the process of starting the host device 2, executes the FAT generation and a process of the sequential write again, and subsequently starts the host device.

Figure 9:
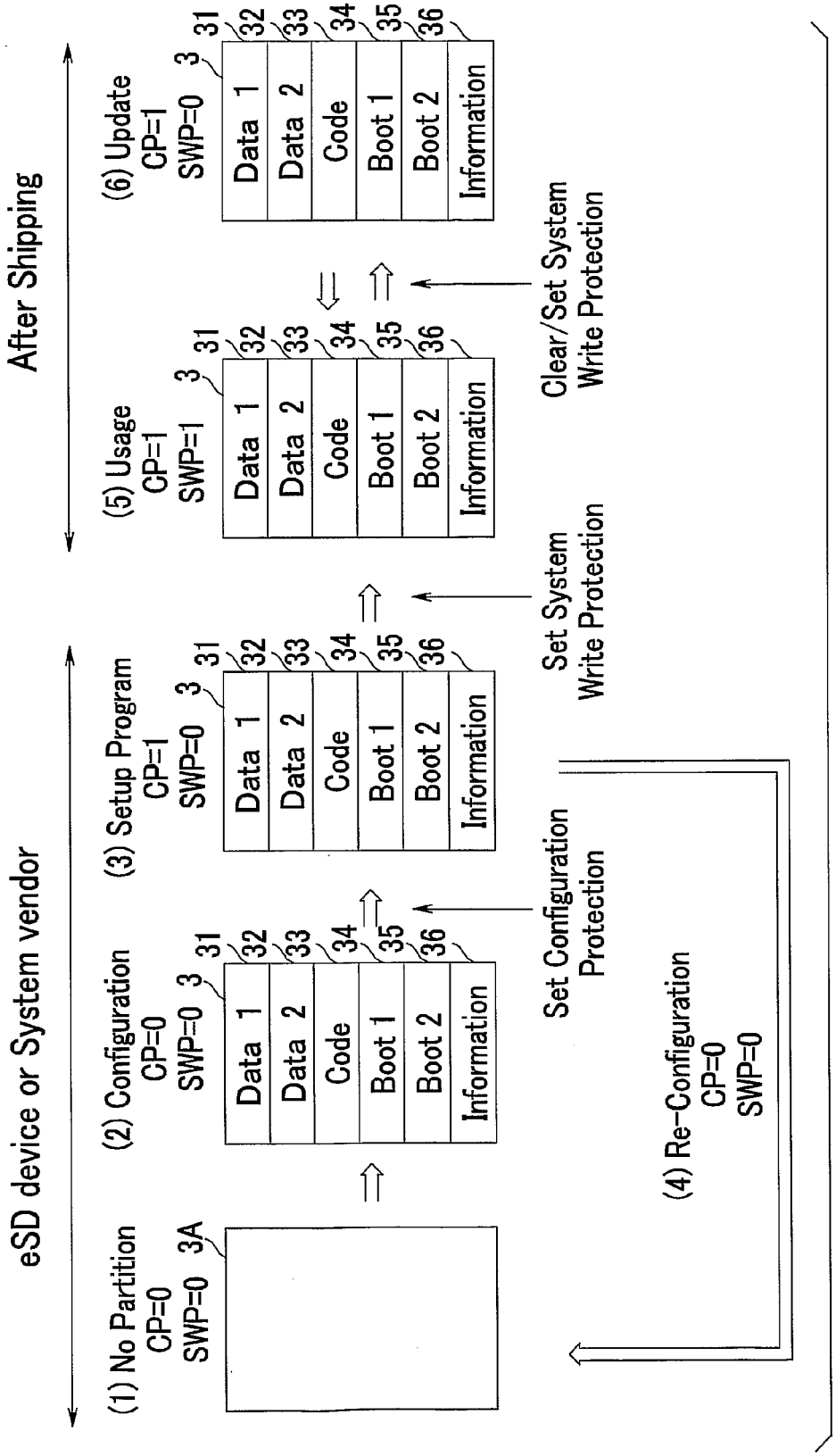
FIG. 9 is an explanatory diagram for explaining protecting means of the memory device of the memory system according to the first and second embodiments.

Next, the protecting means of the memory device 1 will be described by using FIG. 9. FIG. 9 is an explanatory diagram for explaining the protecting means of the memory device 1.

In the memory device 1 in which the multiple partitions have been set, after a process of the Configuration in which the partitions are assigned, a system file and an application file for the memory device 1 are installed. Subsequently, the memory device 1 is shipped and put into a state of being used by the user.

Moreover, as has been already described, the boot partition 34 and the code partition 33 of the memory device 1 are also updated while being used by the user.

However, in order to stabilize the memory system 10, although a configuration of the partitions can be changed in a development stage, it is preferable that the user cannot needlessly change the configuration of the partitions after the shipping. Also for the boot partition 34 or the code partition 33, for the purpose of preventing the tampering by the virus or the like, the memory device 1 preferably has a write protection function.

In other words, the memory device 1 has two different protecting means of Configuration Protection (CP) and System Write Protection (SWP), and performs protection for the configuration of the partitions, and the boot partition 34 or the code partition 33, with the respective protecting means. For example, the memory device 1 can set the protection for the configuration of the partitions, and the boot partition 34 or the code partition 33, respectively, by setting the two protecting means as follows, that is, two parameters.

Configuration Protection (CP) CP=0: reconfiguration enabled

CP=1: reconfiguration disabled

System Write Protection (SWP) SWP=0: Write enabled

SWP=1: Write disabled

Hereinafter, according to FIG. 9, the protecting means of the memory device 1 will be described.

FIG. 9(1) shows the memory section 3A of the memory device 1 in an initial state where the partitions have not been cut.

FIG. 9(2) shows the memory section 3 in a state where the configuration of the partitions has been set by the Configuration process. The configuration of the partitions has been written into the information partition 36 with the partition number of 15. After the configuration of the partitions has been completed, CP=1 is set (Set Configuration Protection) with a command.

FIG. 9(3) shows the memory section 3 in which the system has been installed and the data has been written into the boot partition 34 and the code partition 33. If necessary, the data is also written into the data partitions 31 and 32. Then, the memory device 1 is shipped in a state where SWP=1 has been set (Set System Write Protection) with a command.

FIG. 9(4) shows that, if the configuration of the partitions is desired to be changed before the shipping, clearing as CP=0 (Re-Configuration) can be performed by a special command sequence.

FIG. 9(5) shows the memory section 3A of the memory device 1 in the state of being used by the user.

FIG. 9(6) shows the memory section 3A of the memory device 1 in a state where, if the process of updating the boot partition 34 or the code partition 33 has become necessary, clearing as SWP=0 (Clear System Write Protection) has been performed by one special command sequence and thereby the writing has been temporarily permitted. After the process of updating the boot partition 34 or the code partition 33, the SWP is returned to SWP=1.

The memory device 1 has the SWP which is first protecting means configured to disable the reconfiguration of the divided memory section 3, and second protecting means CP configured to disable the writing into the respective partitions. Consequently, the memory device 1 has advantages as follows.

In the case where a device maker performs the Configuration process for the partitions in the memory device 1 and performs the shipping, if the device maker ships the memory device 1 with CP=1, the reconfiguration of the configuration of the partitions of the memory device 1 can be disabled.

The device maker (eSD device maker) passes a device with CP=0 to a system vendor, and the system vendor executes the Configuration process for the partitions and subsequently performs the shipping with CP=1. After the shipping, the reconfiguration of the memory section 3 is disabled. The device maker has means configured to clear CP=1, and thereby can control a re-Configuration process performed by the system vendor, that is, whether or not the reconfiguration is permitted, or the number of times of the reconfiguration.

The memory device 1 can prevent the tampering, by shipping the memory device 1 with setting of SWP=1. The device maker also enables the partitions to be updated by implementing means configured to perform the clearing as SWP=0, in the memory device 1. Setting statuses of the respective protecting means of the memory device 1, that is, a security level can be controlled by the clearing means.

As described above, the memory device 1 is the memory device 1 connectable to the host device 2, including the memory section 3 which can store the data configured to start the host device 2 and has been divided into the partitions 31 to 36 having the multiple different attributes including the boot attribute in which data of the boot code configured to start the host device 2 is stored, and the code attribute in which the data of the OS program of the host device has been stored; first protecting means configured to disable the change of the configuration of the partitions in the divided memory section; and second protecting means and third protecting means configured to disable the writing into each of the partitions, the first protecting means being protecting means which is unique and settable for an individual memory device 1, the second protecting means being unique protecting means which is set for the individual memory device 1 or in which a clearing method can be individually set for the partitions with the boot attribute and the code attribute, and the third protecting means being common protecting means which can be set with a command having single setting clearing means.

The memory system 10 can disable the reconfiguration of the partitions, and can prevent the system program from being tampered by the virus or the like.

As described above, the memory system of the present invention is as follows.

A memory system including a host device and a memory device which is connectable to the host device and has a memory section and a memory controller, wherein:

the memory section can be divided into partitions having multiple different attributes; and from among multiple different writing methods of writing the data into the partition, one of the writing methods which has been selected depending on the attribute of the partition is used to perform an updating process.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

The present application is based upon and claims the benefit of priority from Japanese Patent Application No. 2008-74258 filed in Japan on Mar. 21, 2008, and the disclosure thereof has been incorporated in the description, the claims and the drawings of the present application by reference.

The invention claimed is:

1. A data updating method of updating data which is stored in a memory device which is connectable to a host device and has a memory section and a memory controller, wherein:

the memory section has a first memory section which can be divided into partitions having multiple different attributes, and a work space which is managed by the memory controller; and from multiple different writing methods of writing data into the partition, one of the writing methods which has been selected depending on the attribute of the partition is used to perform an updating process; and a writing method to update data in a boot-partition which is a partition having a boot attribute, in which the data of a boot code configured to start the host device is stored, includes:

sequentially writing data which is not updated and data which is updated into the work space;

confirming that the writing into the workspace has been normally terminated;

assigning the workspace to the boot-partition if it has been able to confirm that the writing has been normally terminated; and stopping the updating process and discarding the data recorded in the work space if it has not been able to confirm that the writing has been normally terminated.

2. The data updating method according to claim 1, wherein:

a writing method to update data in an information-partition, which is a partition having an information attribute, includes storing existence or nonexistence information, attribute information, and size information on each of multiple partitions; and the information in the information-partition corresponds to the selected one of the writing methods.

3. The data updating method according to claim 1, wherein:

the host device has a system memory section; and a writing method to update data in a code-partition, which is a partition having a code attribute, in which a system management program and system data of the host device have been stored, includes:

constructing a work space area in the first memory section;

copying a file allocation table in the code-partition, into the system memory;

updating the file allocation table in the system memory during writing data which is not updated and data which is updated, into the work space area;

sequentially writing the file allocation table in the system memory and data in the work space area, into the code-partition.

4. The data updating method according to claim 3, comprising:

managing an updating flag by the memory controller, wherein:

before the sequential writing is started, the updating flag is set, and when the updating process has been completed, the updating flag is cleared; and if the updating flag has been set when the data in the code-partition is read for starting the host device, the memory controller notifies the host device of a read error; and thereby stops a process of starting the host device.

5. The data updating method according to claim 1, wherein:

the memory section is a NAND-type flash memory.

6. The data updating method according to claim 1, wherein:

the memory section is a NAND-type flash memory with multi-valued memory cells each of which can record more than one-bit data;

a physical characteristic of the partitions has attributes which are different; and the physical characteristic is at least one of a time required for writing the data into the partition, a time required for reading the data, a number of times in which the data can be written, a number of times in which the data can be read, and reliability of the stored data.

7. The data updating method according to claim 1, wherein:

at a time of startup of a host, if a boot code which is stored in the boot-partition has not been able to read, a backup boot code which is stored in a backup partition is read.

8. The data updating method according to claim 7, wherein:

if the startup has been performed by reading the backup boot code which has been stored in the backup partition, the boot code which has been stored in the boot partition is written into the boot-partition partition again.

* * * * *